(12) United States Patent
Lam

(10) Patent No.: US 9,766,426 B2
(45) Date of Patent: Sep. 19, 2017

(54) MINIATURE LENS DRIVING APPARATUS

(71) Applicant: Sunming Technologies (HK) Limited, Hong Kong (HK)

(72) Inventor: Sio Kuan Lam, Hong Kong (HK)

(73) Assignee: Summing Technologies (HK) Limited, Hong Kong (HK)

( * ) Notice: Subject to any disclaimer, the term of this patent is extended or adjusted under 35 U.S.C. 154(b) by 0 days.

(21) Appl. No.: 14/519,123

(22) Filed: Oct. 20, 2014

(65) Prior Publication Data
US 2016/0109681 A1   Apr. 21, 2016

(51) Int. Cl.
| | |
|---|---|
| *G02B 7/10* | (2006.01) |
| *G02B 7/09* | (2006.01) |
| *G02B 27/64* | (2006.01) |
| *G02B 7/02* | (2006.01) |
| *G02B 7/28* | (2006.01) |
| *G03B 13/36* | (2006.01) |

(52) U.S. Cl.
CPC ............. *G02B 7/102* (2013.01); *G02B 7/026* (2013.01); *G02B 7/09* (2013.01); *G02B 7/28* (2013.01); *G02B 27/646* (2013.01); *G03B 13/36* (2013.01)

(58) Field of Classification Search
USPC ......................................................... 396/55
See application file for complete search history.

(56) References Cited

U.S. PATENT DOCUMENTS

| | | | | |
|---|---|---|---|---|
| 2012/0154614 A1* | 6/2012 | Moriya | ..................... | G03B 3/10 348/208.5 |
| 2012/0219276 A1* | 8/2012 | Suzuka | ................ | G02B 27/646 396/55 |
| 2013/0142502 A1* | 6/2013 | Kang | ........................ | G03B 5/00 396/55 |
| 2014/0362284 A1* | 12/2014 | Shin | ...................... | H04N 5/2254 348/373 |
| 2015/0015729 A1* | 1/2015 | Kasamatsu | .............. | G02B 7/08 348/208.11 |

FOREIGN PATENT DOCUMENTS

| | | |
|---|---|---|
| CN | 103969916 A | 8/2014 |
| EP | 0867742 A2 | 9/1998 |
| JP | H04219709 A | 8/1992 |
| KR | 20140098211 A | 8/2014 |

OTHER PUBLICATIONS

Partial European Search Report of counterpart European Patent Application No. 15163977.0 issued on Mar. 7, 2016.

* cited by examiner

*Primary Examiner* — Clayton E Laballe
*Assistant Examiner* — Dennis Hancock

(57) ABSTRACT

A miniature lens driving apparatus includes plurality of wires, an optical image stabilizing (OIS) mechanism having a lens holder, at least one magnet, and a plurality of coils; and an autofocus (AF) mechanism having an AF moving platform movable along an optical axis, at least one coil, and at least one magnet; wherein the said plurality of coils of the OIS mechanism operatively associates with the said at least one magnet of the OIS mechanism to move the said lens holder of the OIS mechanism along a direction substantially perpendicular to the optical axis; wherein the said at least one coil of the AF mechanism operatively associates with the said at least one magnet of the AF mechanism to move the said AF moving platform along the optical axis.

20 Claims, 14 Drawing Sheets

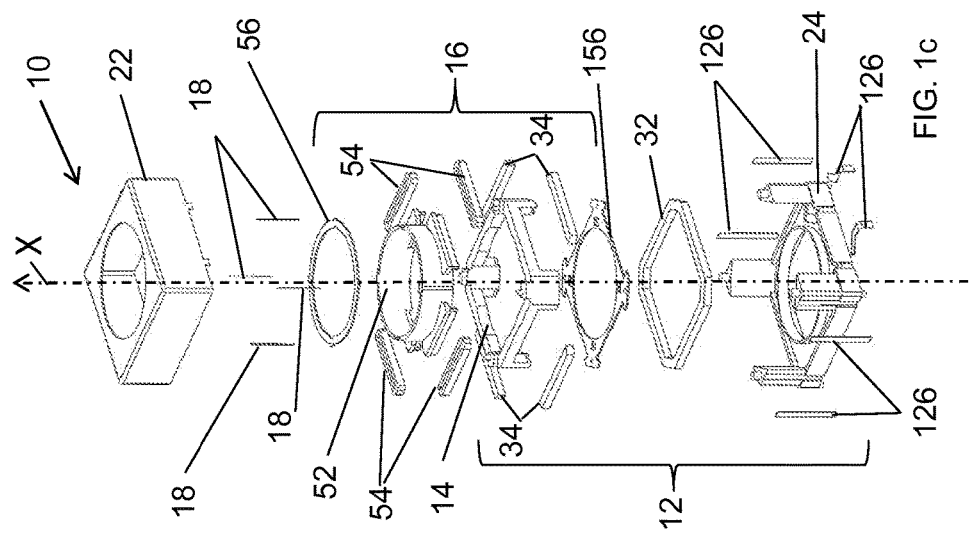
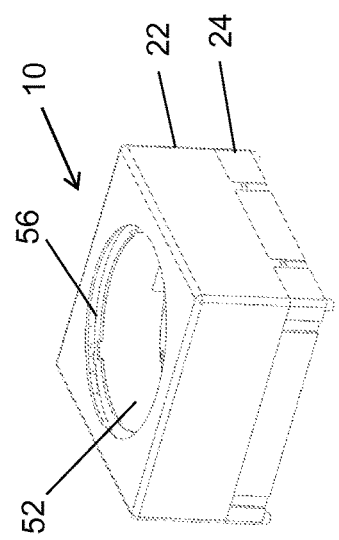
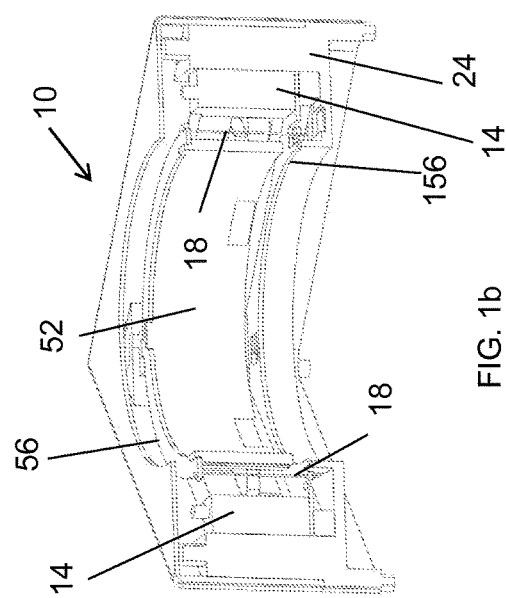

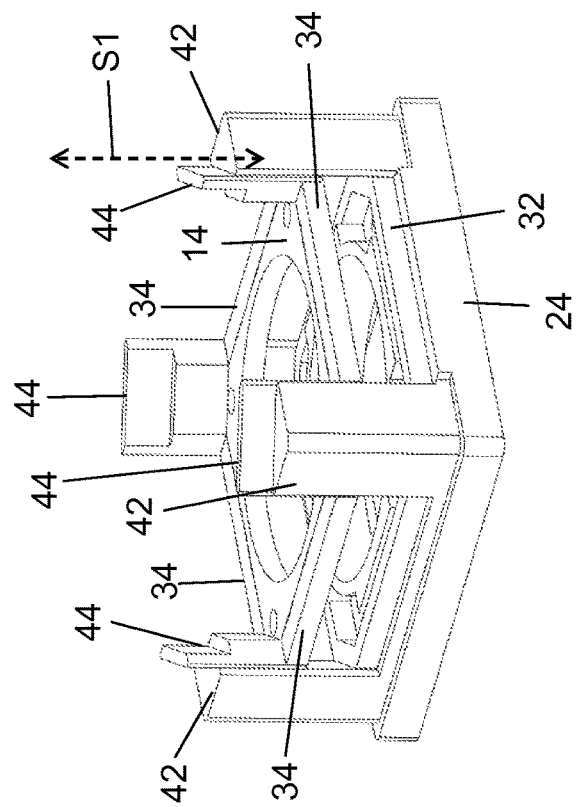
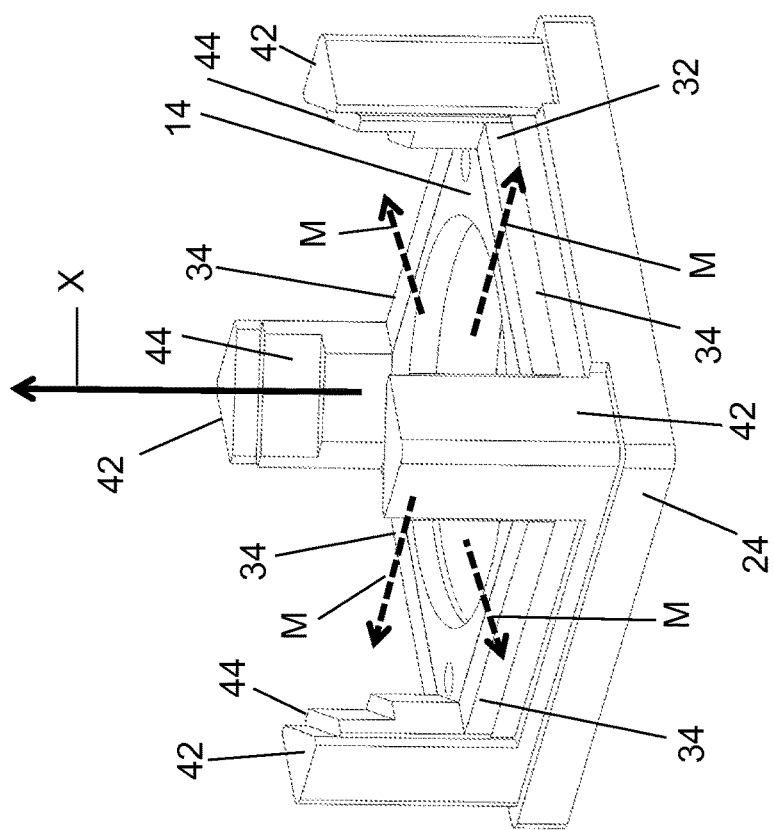

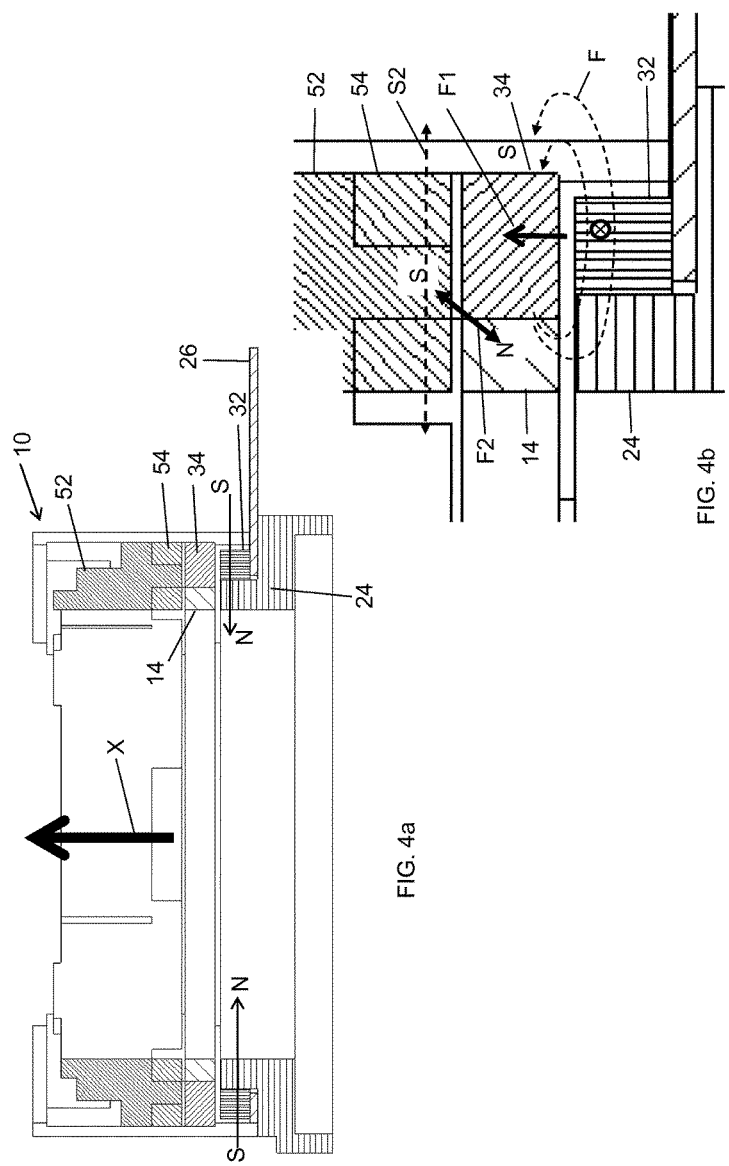

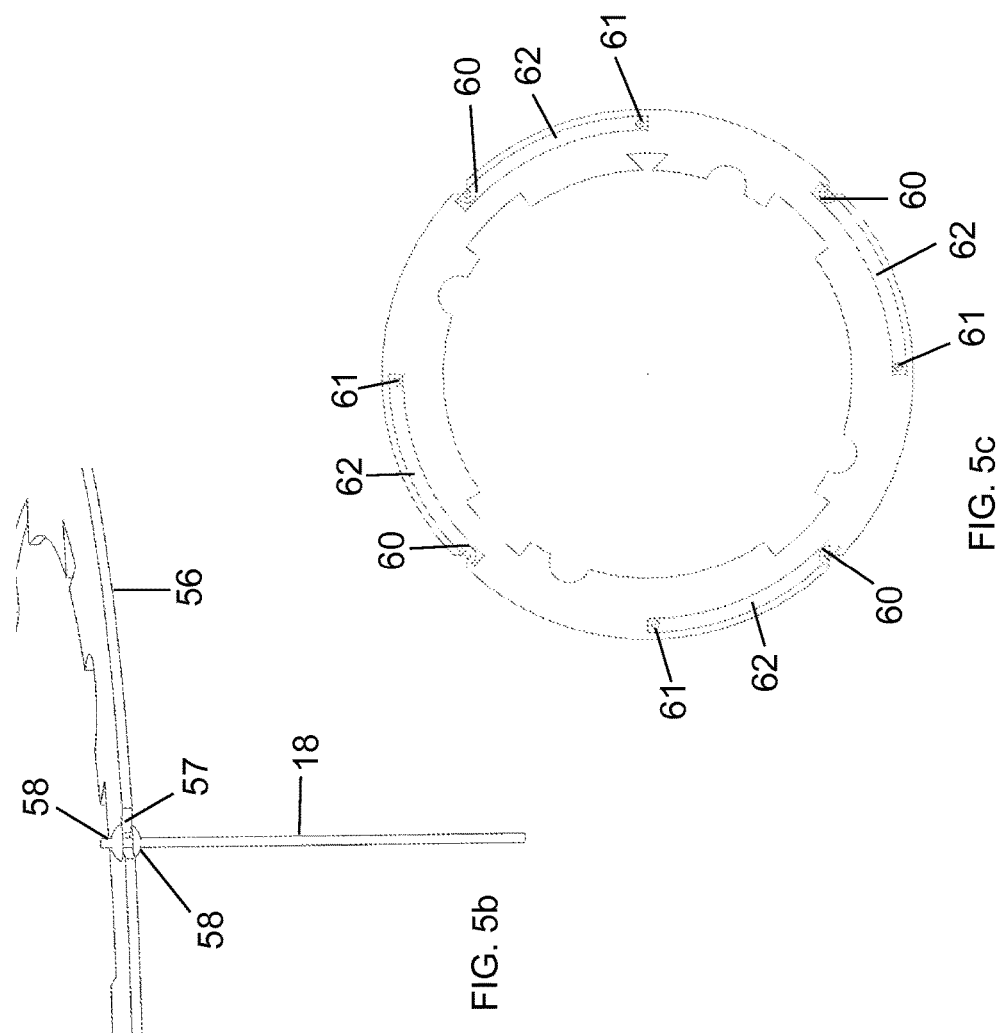
FIG. 5c
FIG. 5b
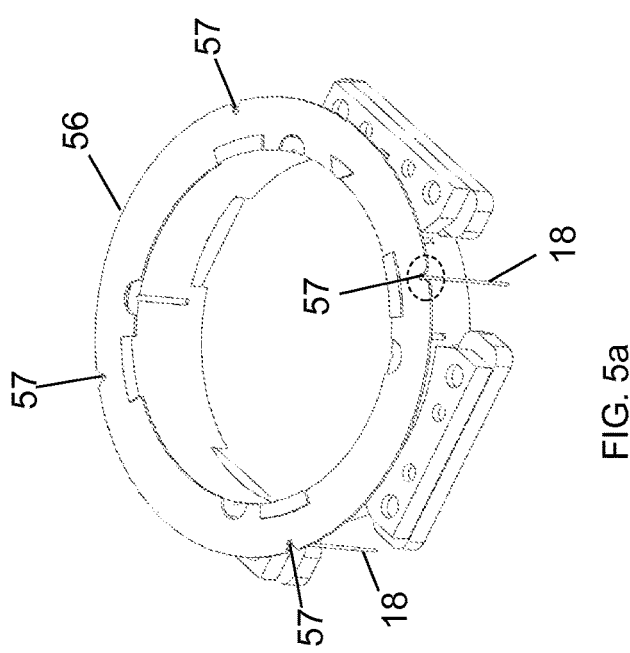
FIG. 5a

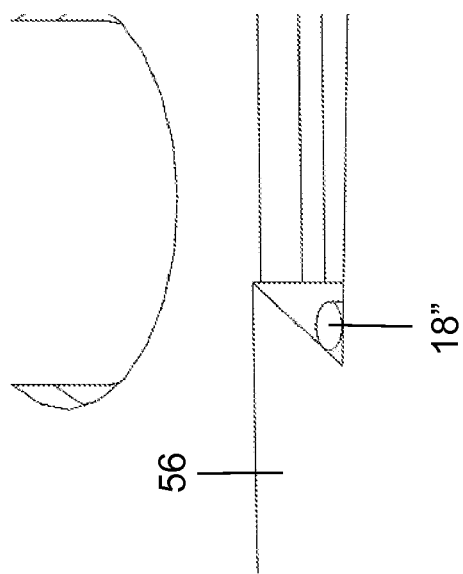
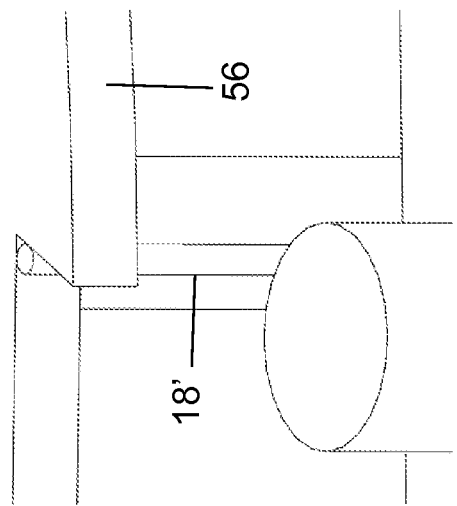

MINIATURE LENS DRIVING APPARATUS

FIELD OF THE TECHNOLOGY

The present application relates generally to a lens driving apparatus which may be integrated within a compact camera module used for portable electronic devices.

BACKGROUND

Compact camera module has been widely adopted in many types of portable electronic device such as smart phone. Many sophisticated camera functions have been integrated into compact camera module, such as autofocus. Recently, the market is requesting the camera module to equip with optical image stabilization function. This in turn requests to have a miniature lens driving apparatus which is capable of moving the imaging lens along X, Y, and Z directions.

SUMMARY

According to one aspect, there is provided a miniature lens driving apparatus including a plurality of wires; an optical image stabilizing (OIS) mechanism having a lens holder, at least one magnet, and a plurality of coils; and an autofocus (AF) mechanism having an AF moving platform movable along the optical axis, at least one coil, and at least one magnet. The plurality of coils of the OIS mechanism operatively associates with the at least one magnet of the OIS mechanism to move the lens holder along a direction substantially perpendicular to an optical axis; and the at least one coil of the AF mechanism operatively associates with the at least one magnet of the AF mechanism to move the AF moving platform along the optical axis. The lens holder of the OIS mechanism is coupled with the AF moving platform via the plurality of wires directly or indirectly.

The AF mechanism may further include at least one guiding mechanism having a stationary guide member and a slidable guide member. The stationary guide member is firmly mounted on the base while the slidable guide member is firmly mounted on the AF moving platform. The guiding mechanism may be in the form of guiding shafts, V-shape grooves, dovetail-shaped grooves, C-shaped grooves, guiding planes, guiding holes or guiding rings.

The OIS mechanism may further include a wire coupling member attached to the lens holder, and wherein one end of each wire is coupled to the wire coupling member. In one embodiment, the wire coupling member is in the form of a printed circuit board with conductive traces and bonding pads provided thereon.

The AF moving platform may further include a wire coupling member, and wherein one end of each wire is coupled to the wire coupling member. In one embodiment, the wire coupling member is in the form of a printed circuit board with conductive traces and bonding pads provided thereon.

The plurality of wires may be in the form of metal wire, enamel metal wire, metal-clad metal wire, metal-clad plastic wire or combinations thereof. The plurality of wires may be made of conductive materials, non-conductive materials, polymeric materials, plastics, rubbers or organic fibers.

The AF mechanism may further include a printed circuit board or flexible printed circuit board to provide electric connection.

In one embodiment, the lens driving apparatus may further include a stiffening member connected to the slidable guide member. A viscous liquid may be provided in a gap between the stiffening member and the lens holder, and/or a gap between the lens holder and the moving platform. Opposing surfaces of the stiffening member and the lens holder, and/or opposing surfaces of the lens holder and the moving platform can be formed with a plurality of pits for receiving therein the viscous liquid.

In one embodiment, the AF mechanism and/or the OIS mechanism may further include at least one Hall sensor or position encoder to sense position of a lens.

In one embodiment, the AF mechanism may include at least one spring with one end connected to a base of the AF mechanism and the other end connected to the AF moving platform. The spring may be in the form of a leaf spring, helix spring or elastic film.

According to another aspect, there is provided an electronic image-capturing device, such as mobile phones, cameras, etc., which includes the lens driving apparatus disclosed in the present application.

Although the miniature lens driving apparatus is shown and described with respect to certain embodiments, it is obvious that equivalents and modifications will occur to others skilled in the art upon the reading and understanding of the specification. The miniature lens driving apparatus in the present application includes all such equivalents and modifications, and is limited only by the scope of the claims.

BRIEF DESCRIPTION OF THE DRAWINGS

Specific embodiments of the miniature lens driving apparatus will now be described by way of example with reference to the accompanying drawings wherein:

FIG. 1a is a perspective view of a miniature lens driving apparatus according to an embodiment thereof.

FIG. 1b is a cutaway view of the miniature lens driving apparatus of FIG. 1a.

FIG. 1c is exploded view of the miniature lens driving apparatus according to an embodiment thereof.

FIG. 2a is a perspective view of the base with the printed circuit board, the AF coil, a slidable platform being slidably engaged with the base, and a plurality of magnets provided on the slidable platform.

FIG. 2b is a perspective view similar to that in FIG. 2a showing the sliding direction of the moving platform.

FIG. 4a is a cross sectional view of the miniature lens driving apparatus according to an embodiment thereof.

FIG. 4b is an enlarged cross sectional view of a section of the miniature lens driving apparatus according to an embodiment thereof.

FIG. 5a is a perspective view of the wire coupling disc being mounted on the lens holder of the miniature lens driving apparatus according to an embodiment thereof.

FIG. 5b is an enlarged perspective view of the wire coupling disc being connected to the wire of the miniature lens driving apparatus according to an embodiment thereof.

FIG. 5c is a top view of the wire coupling disc being provided thereon with conductive traces and bonding pads for wires according to an embodiment thereof.

FIGS. 9f and 9g are enlarged perspective views of the wires of the miniature lens driving apparatus shown in FIG. 9a.

DETAILED DESCRIPTION

Figure 1E:
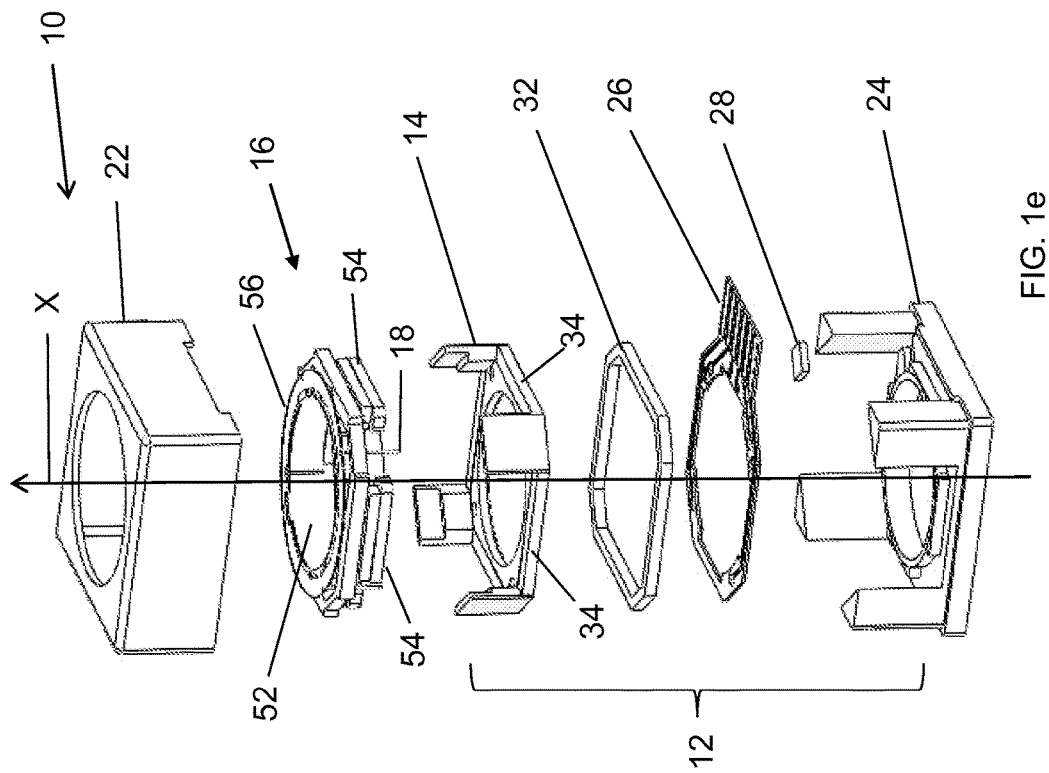
FIG. 1e is exploded view of the miniature lens driving apparatus of FIG. 1d.

In the following detailed description, numerous specific details are set forth to provide a thorough understanding of claimed subject matter. However, it will be understood by those skilled in the art that claimed subject matter may be practiced without these specific. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particularly embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and", "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

As used to describe such embodiments, terms "above", "below", "upper", "lower", and "side" describes positions relative to an optical axis of such a compact imaging module. In particular, "above" and "below" refer to positions along an optical axis, wherein "above" refers to one side of an element and "below" refers to an opposite side of the element. Relative to such an "above" and "below", "side" refers to a side of an element that is displaced from an optical axis, such as the periphery of a lens, for example. Further, it is under stood that such terms do not necessarily refer to a direction defined by gravity or any other particular orientation. Instead, such terms are merely used to identify one portion versus another portion. Accordingly, "upper" and "lower" may be equivalently interchanged with "top" and "bottom", "first" and "second", "right" and "left", and so on.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element or is in mechanical or electrical communication with another element.

It should be noted that throughout the specification and claims herein, the term "wire" is defined as a thin length of a material. It can also be a thread of metal, polymer, cotton, hemp, or other material twisted together to form a thin length or line. It is used as a synonym of string, rope, cord, thread, and line.

It should be understood that the present application is not limited to the preferred embodiments described hereinabove and, needless to say, a variety of modifications or variations may be made without departing from the scope of the protection defined herein.

A miniature lens driving apparatus 10 may include a plurality of wires 18, an optical image stabilizing (OIS) mechanism 16 having a lens holder 52, and an autofocus (AF) mechanism 12 having an AF moving platform 14; wherein the said OIS mechanism 16 is capable of moving the lens holder 52 along a direction substantially perpendicular to the optical axis X; and the said AF mechanism 12 is capable of moving the AF moving platform 14 along the optical axis X; wherein the said lens holder 52 of OIS mechanism 16 can be coupled to the AF moving platform 14 via the plurality of wires 18. Defined hereinafter, the said AF moving platform 14 is referring to the aggregation of all moving parts of AF mechanism 12, but excluding the coil, magnet, and spring.

FIGS. 1a-1c shows one of the embodiments of the above said miniature lens driving apparatus 10. The miniature lens driving apparatus 10 may include an upper casing (top cover) 22, a plurality of wires 18, and an autofocus (AF) mechanism 12, which may include an AF moving platform 14 movable along an optical axis X, a bottom casing 24, at least one coil 32, and at least one magnet 34; wherein the AF moving platform 14 may include a platform, and a wire coupling member 156, which is used to connect the AF moving platform 14 to the lens holder 52 of OIS mechanism 16 via the plurality of wires 18. The wire coupling member 156 can be mechanically firmly attached to a lower end of the said platform. In another embodiment, the wire coupling member 156 can be integrated into the said platform and become an undetectable part of the said platform. In that case, AF moving platform 14 may include the said platform only. In other words, the plurality of wires 18 can be directly connected to the AF moving platform 14 in another embodiment. The bottom casing 24 is also named as base. The said coil 32 of the AF mechanism 12 is named herein as AF coil 32. The AF coil 32 can be mechanically firmly mounted on the base 24. The leads of AF coil 32 can be directly or indirectly electrically connected to the electrodes 126. At least one magnet 34 is mounted on the AF moving platform 14 and moving together with the AF moving platform 14 along the optical axis. The said at least one AF coil 32 operatively associates with at least one magnet 34 to drive the AF moving platform 14 and at least one magnet 34 to move along the optical axis. In another embodiment, the said at least one magnet 34 may be mounted on the base 24 while the said at least one AF coil 32 may be mounted on the AF moving platform 14 and moving together with the AF moving platform along the optical axis.

In the above said miniature lens driving apparatus, the above said AF mechanism may further include a plurality of guiding mechanisms used to guide the AF moving platform moving along the optical axis; wherein the guiding mechanism may comprise a stationary guide member and a slidably guide member installed onto the base and AF moving platform respectively. As shown in FIGS. 2a and 2b of the present embodiment, a plurality of stationary guide members 42 and a plurality of slidable guide members 44 can be installed on the corner areas of the base 24 and AF moving platform 14 respectively (FIGS. 2a and 2b). In some other embodiments, the guide members 42 and 44 may be installed on the other area of base 24 and AF moving platform 14. The AF moving platform 14 may be slidably engaging with the base 24 via the guide members 42, 44, as shown in FIGS. 2a and 2b. In the present embodiment, the stationary guide members 42 may be in the form of four blocks extending from the corner areas of the base 24. Each block may contain a flat surface or plane parallel to the optical axis X which may be designed to be the normal direction of the base 24. The guiding function is achieved by sliding of the plane of slidably guide member on the plane of stationary guide member. However, the guiding direction of such guiding mechanism is two dimensional, which means the sliding direction may not align with the optical axis. Therefore, four guiding mechanisms are installed on the AF mechanism, which is four pairs of stationary-slidably guide members are installed on the corner area of the base and AF moving platform respectively. Every two planes of two stationary-slidably pairs can be pairing together to limit the AF moving platform 14 to move along the respective diagonal direction perpendicular to optical axis X. Therefore, the overall result of these four pairs of guide members 42 and 44 is that the AF moving platform 14 can only move along the optical axis X. Therefore, in the present embodiments, four pairs of guiding mechanism are necessary.

Figure 3A:
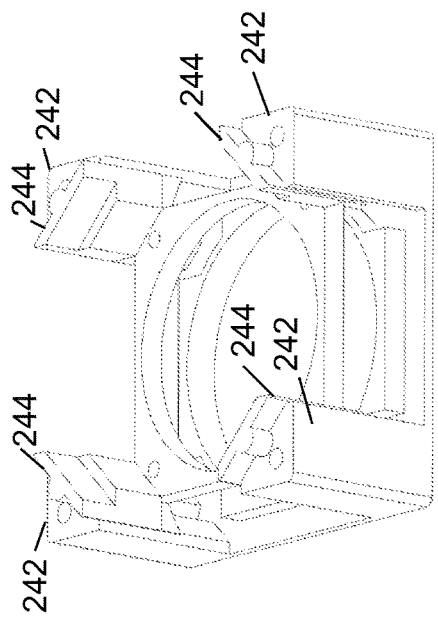
FIGS. 3a-d show different guiding mechanisms.
Figure 3B:
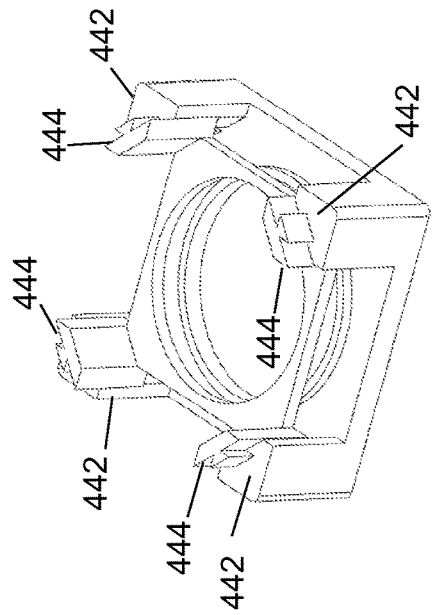
Figure 3C:
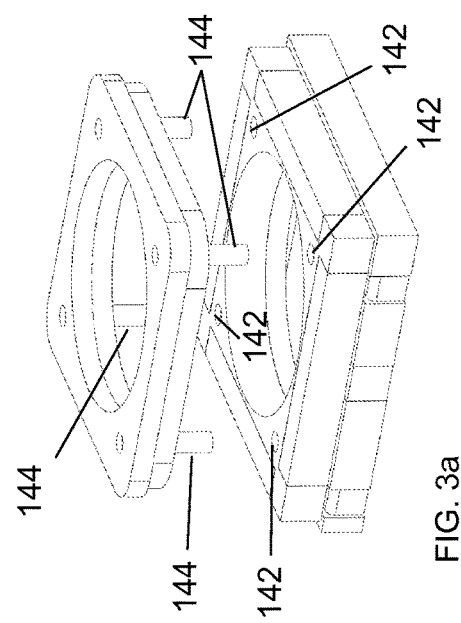
Figure 3D:
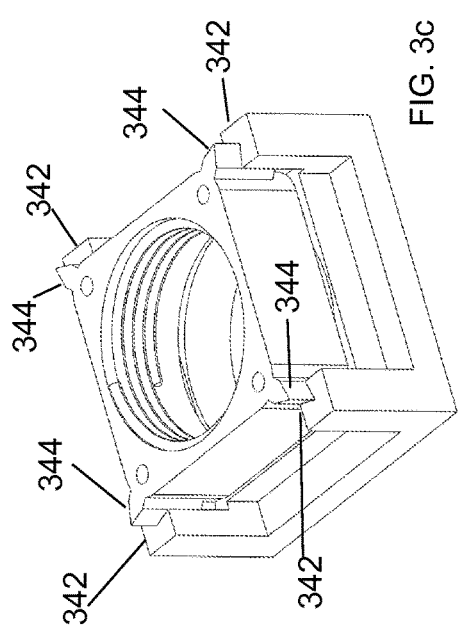

FIGS. 3a-d shows some other embodiments of the guiding mechanisms. FIG. 3a shows a guiding shaft-hole type guiding mechanism 142, 144. FIG. 3b shows a C-curve surface mating type guiding mechanism 242, 244. FIG. 3c shows a V-groove type guiding mechanism 342, 344. FIG. 3d shows a dovetail-groove type guiding mechanism 442, 444. Obviously, the guide members 42, 44 may be in the form of various means and shapes to mate with the stationary member 42 on the base. Such various means and shapes may include but not limited to guiding shafts, V-shaped grooves, dovetail-shaped grooves, guiding planes, guiding holes, guiding rings, etc. For one skill in the art can easily realize many other guiding mechanisms, such as ring type, slot type, ball type, and etc. Needless to say, all these variation of guiding mechanism do not depart from the scope of the protection defined herein. Furthermore, it is also obvious that for other type of guiding mechanisms, it is not necessary to use four pairs of guiding mechanism. Drawing four shafts or guiding mechanisms in FIGS. 3a-d are just purely for the symmetric arrangement of the shafts on the rectangular base 24. Needless to say, using 1, 2, or 3 shafts or even more shafts in the implementation does not depart from the scope of the protection defined herein.

Moreover, in some embodiments, lubricant, oil, grease, or liquid (such as water) can be applied to the contact surfaces or planes of the four pairs of guide members 42 and 44 to reduce the friction between the base 24 and the AF moving platform 14.

Figure 1D:
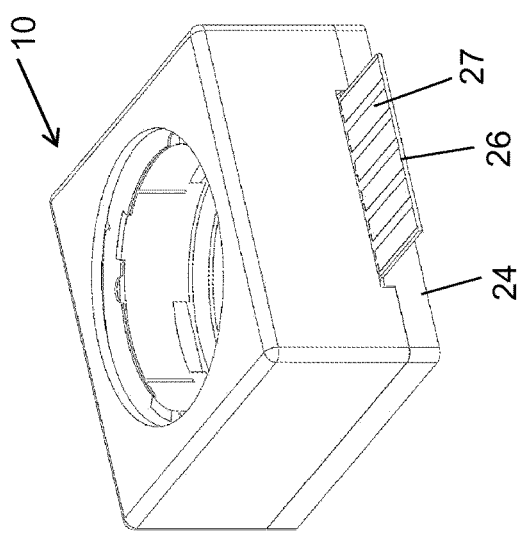
FIG. 1d is a perspective view of a miniature lens driving apparatus according to another embodiment thereof.
Figure 7E:
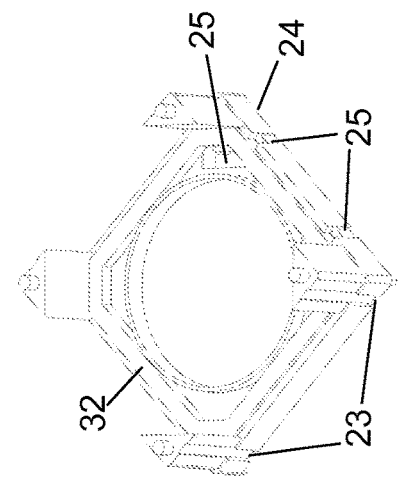
FIG. 7e is a perspective view of another embodiment of the base.
Figure 7D:
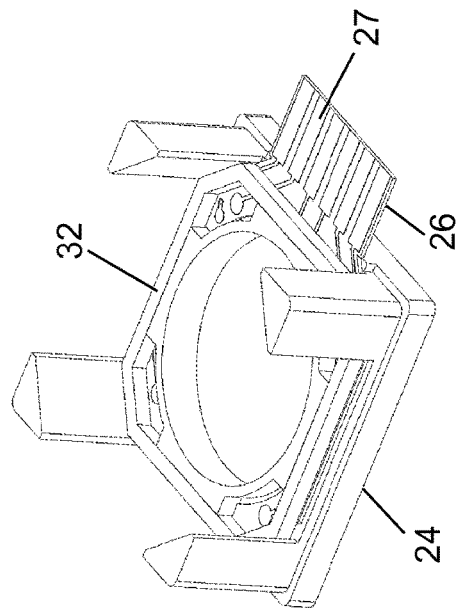
FIG. 7d is a perspective view of the base with the printed circuit board and an AF coil 32 being mounted thereon.
Figure 7B:
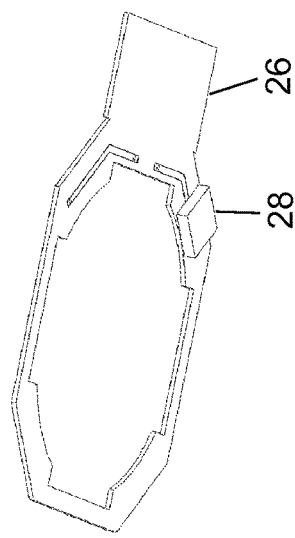
FIG. 7b is a bottom perspective view of a printed circuit board of the miniature lens driving apparatus according to an embodiment thereof.
Figure 7C:
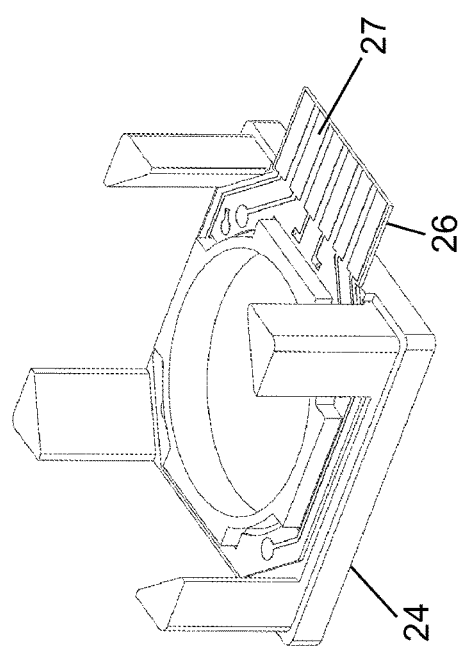
FIG. 7c is a perspective view of the base with the printed circuit board being mounted thereon.

In the above said miniature lens driving apparatus, the above said AF mechanism may further include a printed circuit board (PCB) or flexible printed circuit board (fPCB) in some other embodiments (FIGS. 1d and 1e). In such embodiments, the AF coil 32 may be mechanically firmly mounted on and electrically connected to the printed circuit board 26 which may be firmly mounted on the base 24 (FIGS. 7c and 7d). PCB 26 has electrodes 27 which are used to provide electrical contact with the outside world. It should be noted that the fPCB or PCB shown in FIGS. 1d-e and 7c-d is purely for conceptual illustration purpose. Needless to say, the change of shape and/or circuitry of fPCB or PCB do not depart from the scope of protection defined herein.

In the above said AF mechanism of the said miniature lens driving apparatus, the magnets 34 may be firmly attached to the peripheral areas of the AF moving platform 14 and movable together with the AF moving platform 14. In some other embodiments, the magnets 34 can be mounted on the corner area of the AF moving platform. Needless to say, the magnets can also be mounted on the base or a yoke mounted on the base. The magnetization directions M (FIG. 2a) of the magnets 34 are all lying in a plane which is substantially perpendicular to the optical axis X. Or in other words, the magnetization directions M of the magnets 34 are all lying in a plane which is substantially parallel to the surface of the AF moving platform 14. Furthermore, the magnetization directions M of the magnets 34 are all either pointing inwards or outwards. The AF moving platform 14 can be moved in an optical axis direction S1 (FIG. 2b). In another embodiment, the AF coil 32 may be attached to the AF moving platform 14 while the magnets 34 may be attached to the base 24.

In some embodiments, the base 24 may be integrally formed with slots 23 for receiving therein electrodes extending from OIS coils 54 (FIG. 7e) of the OIS mechanism 16. Electrodes 25 may be mounted in the base 24 for electrical contact with the outside world.

The above said miniature lens driving apparatus may further include an OIS mechanism 16 as shown in FIG. 1c, which may include a lens holder 52, a wire coupling member 56, at least one magnet 34, and a plurality of coils 54. The lens holder 52 of OIS mechanism 16 may be connected to the AF moving platform of the AF mechanism 12 via a plurality of wires 18. In the present embodiment, a wire coupling member is mechanically firmly attached to the upper portion of the said lens holder 52. A plurality of wires is connected to the lens holder via this wire coupling member. In another embodiment, the wire coupling member is integrated into the lens holder and become an undetectable part of the lens holder. In the other words, a plurality of wires is directly connected to the lens holder in another embodiment. A plurality of coils is firmly mounted on the lens holder and operatively associates with the said at least one magnet mounted on the AF moving platform to drive the lens holder moving along a direction substantially perpendicular to the optical axis.

FIG. 4a shows a cross sectional view of the assembly of present embodiment and FIG. 4b is an enlarged sectional view of the magnet-coils structure or the electromagnetic force generators of the FIG. 4a. In the present embodiment, the OIS mechanism 16 and AF mechanism 12 may be sharing the same set of magnets 34. The OIS and AF mechanisms are utilizing the magnetic field on the upper and lower side of the same magnet respectively. Moreover, the magnets 34 can be mounted on the AF moving platform 14 and the magnetization directions M of the magnets 34 may be all lying in the same plane perpendicular to the optical axis X in the present embodiment. The magnetization directions M of the magnets 34 may be all either pointing inwards or outwards. When the AF moving platform 14 is locating at its lowest extreme of its sliding range, the magnets 34 may be sitting on top of the AF coil 32 or a tiny gap may exist between the magnets 34 and AF coil 32. When an electric current is applied to the AF coil 32, an electromagnetic force F1 is generated to drive the AF moving platform 14 to move along the optical axis X for autofocusing.

The OIS coils 54 may be firmly mounted on the lens holder 52 which in turn may be mounted on the AF moving platform 14 in such a way that the OIS coils 54 are disposed adjacent to the magnets 34 used for autofocus function. When an electric current is applied to the OIS coils 54, the OIS coils 54 will generate an electromagnetic field which in turn interacts with the magnetic field F of the magnets 34 and a push/pull force F2 is thus generated. Limited by wires 18, the so-generated push/pull force F2 will drive the lens holder 52 to move/swing along a plane substantially perpendicular to the optical axis X in a horizontal direction S2 for image stabilization. Generally, a small gap may exist between the magnets 34 and the OIS coils 54 so that there will be no friction between the AF moving platform 14 and the lens holder 52. However, in some embodiments the lens holder 52 is in direct physical contact with the AF moving platform 14. No gap is left in between. In such embodiment, the OIS actuators have to be powerful enough to move the lens holder. In some other embodiments, lubricant, oil, grease, or liquid (such as water) may be applied to the contact interfaces between AF moving platform 14 and lens holder 52 to reduce the friction.

As described in the above, the OIS mechanism 16 and AF mechanism 12 may be sharing the same set of magnets 34. The OIS and AF mechanisms are utilizing the magnetic field on the upper and lower side of the same magnet respectively. However, in some other embodiments, OIS and AF mechanisms may have their own magnet and either magnet of OIS mechanism or AF mechanism are all mounted on the AF moving platform together. In other embodiments, the magnets used for OIS may be mounted on the other location of the said miniature lens driving apparatus, but not on AF moving platform. In some embodiments, the upper casing or top cover may be made of magnetic conductive material and used as yoke to confine the spatial magnetic field distribution.

FIGS. 5a-5c show more detail about the wire coupling member of OIS mechanism. The wires 18 can be connected to the lens holder 52 via the wire coupling member 56 as illustrated in the present embodiment. In some other embodiments, the wire coupling member 56 may be integrated with the lens holder 52 as a part of the lens holder 52. Or in other words, in some other embodiments, the wires 18 are directly connected to the lens holder 52. In present embodiment, the first or lower ends of the wires 18 can be connected to the AF moving platform 14 and the second or upper ends of the wires 18 can be connected to the lens holder 52. In some other embodiments, the lower ends of the wires 18 can be connected to another wire coupling member, which can be in turn connected to the AF moving platform 14.

The wire coupling member 56 is not necessary circular or in the shape of a disc, as shown in the illustrated embodiment. It can take any shape as long as it will not jeopardize the lens holder 52 movement and/or the AF platform 14 movement. The wire coupling member 56 may be made of plastics, polymers, metal, ceramic, or composite material made of plastic, polymers, metal, and/or ceramic. The wire coupling member 56 may also be made of the same material as the lens holder 52. In another embodiment, the wire coupling member 56 may be integrated into the lens holder 52 as a part of lens holder 52. In the present embodiment, the wire coupling member 56 may be attached firmly to the lens holder 52 by adhesives or some kinds of physical or chemical bonding method. The plurality of wires 18 may be connected to the wire coupling member 56 by adhesives or soldering 58 at a wire-disc connection point 57.

In another embodiment shown in FIG. 5b, the wire coupling member 56 may be in the form of a printed circuit board which has circuitry to provide electrical connections between coil leads and wires. In another embodiment, conductive traces 62, conductive wires, circuitry, channels, or paths are embedded into or printed onto or mounted on the wire coupling member 56 to provide an electrical connection means between the plurality of wires 18 and the OIS coils 54. Bonding pads 60 for wires and bonding pads 61 for coil leads may be provided on the printed circuit board. Although FIGS. 5a-c shows how the second or upper ends of the wires 18 are connected to the lens holder 52, all the methods or means provided above can all be applied to the first and lower ends of the wires 18 for connection to the AF moving platform 14. Needless to say, it will be understood by those skilled in the art that the above mentioned methods or means can all be applied to the AF moving platform 14 without these specifics.

Figure 6D:
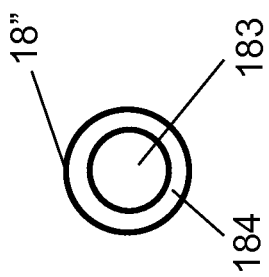
FIG. 6d is a cross sectional view of the wire according to a third embodiment thereof.
Figure 6C:
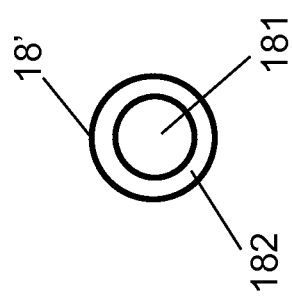
FIG. 6c is a cross sectional view of the wire according to a second embodiment thereof.
Figure 6B:
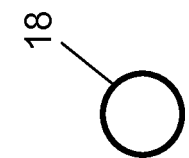
FIG. 6b is a cross sectional view of the wire according to a first embodiment thereof.
Figure 6A:
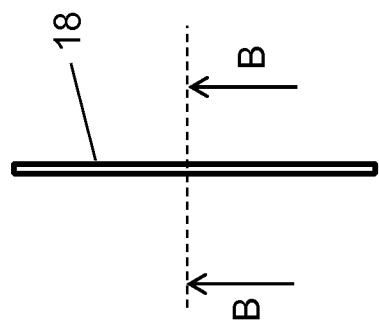
FIG. 6a is side view of a wire of the miniature lens driving apparatus according to an embodiment thereof.

The wires 18 (FIGS. 6a-6d) may be using conductive materials, including but not limited to metal wires, enamel insulated wires, or other types of complex wires, such as wires 18' having a central metal wire 181 and an outer insulated layer 182 (FIG. 6c), and wire 18" having an insulated core 183 and an outer metal or conductive layer 184 (FIG. 6d). In another embodiment, the wires 18 may be using non-conductive materials, polymeric materials, plastics, rubbers, organics fibers, etc. The plurality of wires 18 may include metal wire, enamel metal wire, metal-clad metal wire, metal-clad plastic wire and a combination thereof.

Figure 7A:
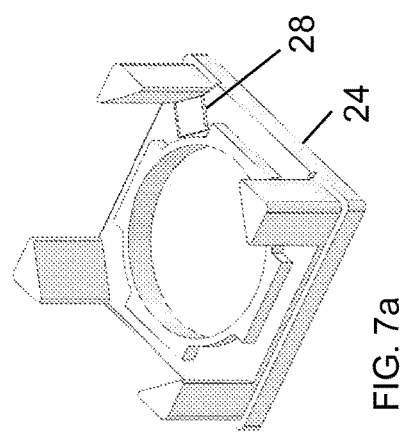
FIG. 7a is a perspective view of a base of the miniature lens driving apparatus according to an embodiment thereof.

In another embodiment, a Hall sensor or position encoder 28 can be either directly mounted on the printed circuit board 26 (FIG. 7b) or the base 24 (FIG. 7a). In some other embodiments, flexible printed circuit board (fPCB) may be used to replace the printed circuit board 26. Moreover, in some other embodiments, the fPCB or PCB can be removed and the coil 32 may be directly mounted on the base 24 and electrically connected to the electrodes as shown in FIG. 7e. In some other embodiments, Hall sensor or position encoder can be mounted on the lens holder of OIS mechanism, or other locations to measure the lens position of OIS. Therefore, in general, a miniature lens driving apparatus may include a plurality of wires, an OIS mechanism having a lens holder, an AF mechanism having an AF moving platform, and at least a Hall sensor or position encoder; wherein the said OIS mechanism is capable of moving the lens holder along a direction substantially perpendicular to the optical axis; and the said AF mechanism is capable of moving the AF moving platform along the optical axis; wherein the said lens holder of OIS mechanism is coupled to the AF moving platform via a plurality of wires; wherein the Hall sensor or position encoder is used to sense the lens position along the optical axis and/or the position on a plane substantially perpendicular to the optical axis.

Figure 8B:
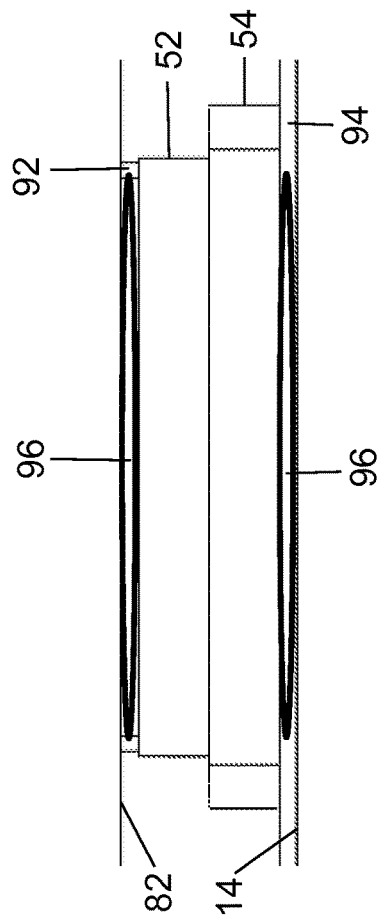
FIG. 8b is a cross sectional view of the optical image stabilizing mechanism and the application of a viscous liquid according to an embodiment thereof.
Figure 8C:
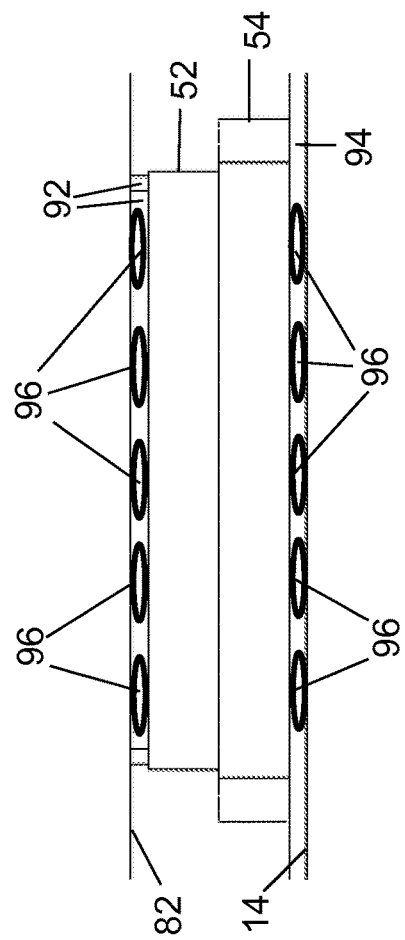
FIG. 8c is a cross sectional view of the optical image stabilizing mechanism and the application of a viscous liquid according to another embodiment thereof.
Figure 8A:
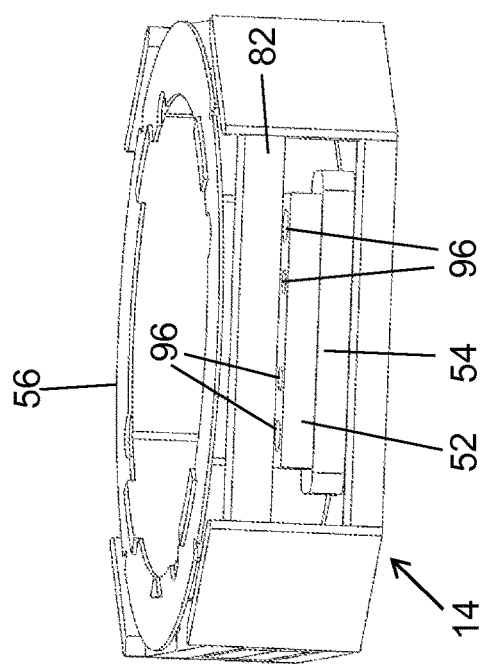
FIG. 8a is a perspective view of the stiffener being mounted on the optical image stabilizing mechanism of the miniature lens driving apparatus according to an embodiment thereof.

FIG. 8a shows another aspect of the OIS mechanism 16. Except the wires 18 which are used to connect the lens holder 52 to the AF moving platform 14, there are no other portions which are connecting the lens holder 52 to the AF moving platform 14. Therefore, the lens holder 52 of the OIS mechanism 16 can be suspending in the air via the plurality of wires 18. As shown in FIG. 8b, a gap 92 may be formed between the stiffening member 82 and lens holder 52. The stiffening member 82 is used to connect the slidable guide members to enhance the rigidity of the AF moving platform. In some embodiment, the stiffening member 82 is an individual component. There will also be another gap 94 between the bottom surface of the lens holder 52 and the upper surface of the base 24 of AF moving platform 14.

In another embodiment as shown in FIGS. 8b and 8c, a viscous liquid 96 can be applied to the gaps 92, 94 to fill in the space of the gaps 92, 94. The viscous liquid 96 can be either fill in one of the gaps or both of the gaps. The viscous liquid 96 can be either a big drop of that liquid or a plurality of smaller drops of the viscous liquid 96.

Figure 8E:
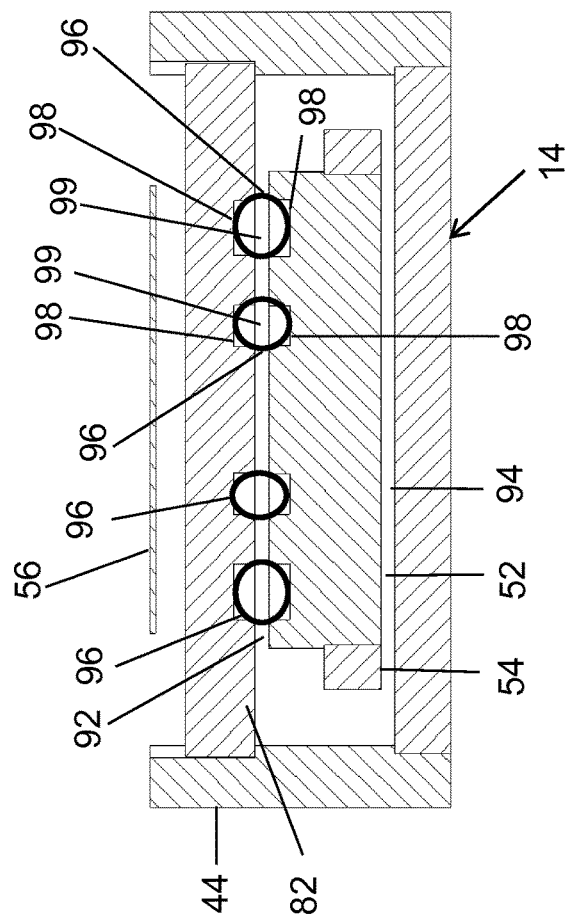
FIG. 8e is a cross sectional view taken along line A-A in FIG. 8d shows a plurality of pits and the application of the viscous liquid in the miniature lens driving apparatus according to an embodiment thereof.
Figure 8D:
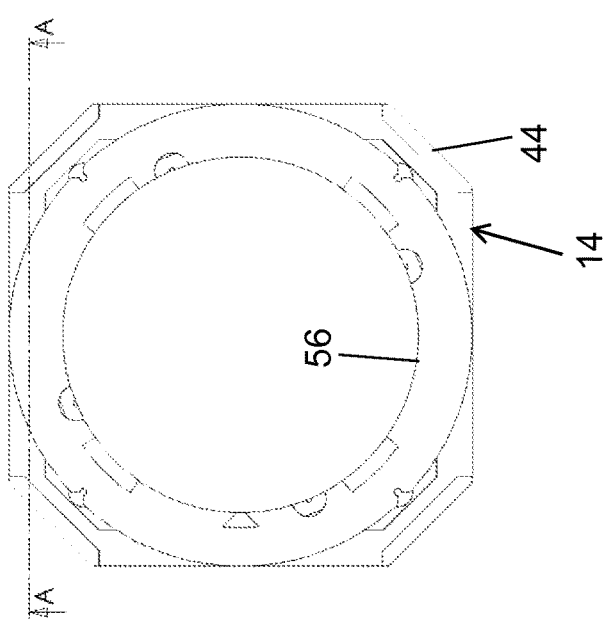
FIG. 8d is a top view of the optical image stabilizing mechanism of the miniature lens driving apparatus according to an embodiment thereof.

FIGS. 8d and 8e show another embodiment, in which a plurality of pits 98 may be formed on the bottom surface of the stiffening member 82 and/or the upper surface of the lens holder 52. It can be a one-side pit structure in which only one of stiffening member 82 and lens holder 52 has the pits 98 and the other one may be a flat surface. The pits 98 on one surface can be pairing with pits on an opposing surface to form a small cavity 99 which can be used to hold the viscous liquid 96. The so-formed cavity will be more efficient to hold the viscous liquid 96 rather than the gap shown in FIGS. 8b and 8c. The viscous liquid is used to enhance the mechanical rigidity of the lens driving apparatus along the optical axis.

Figure 9A:
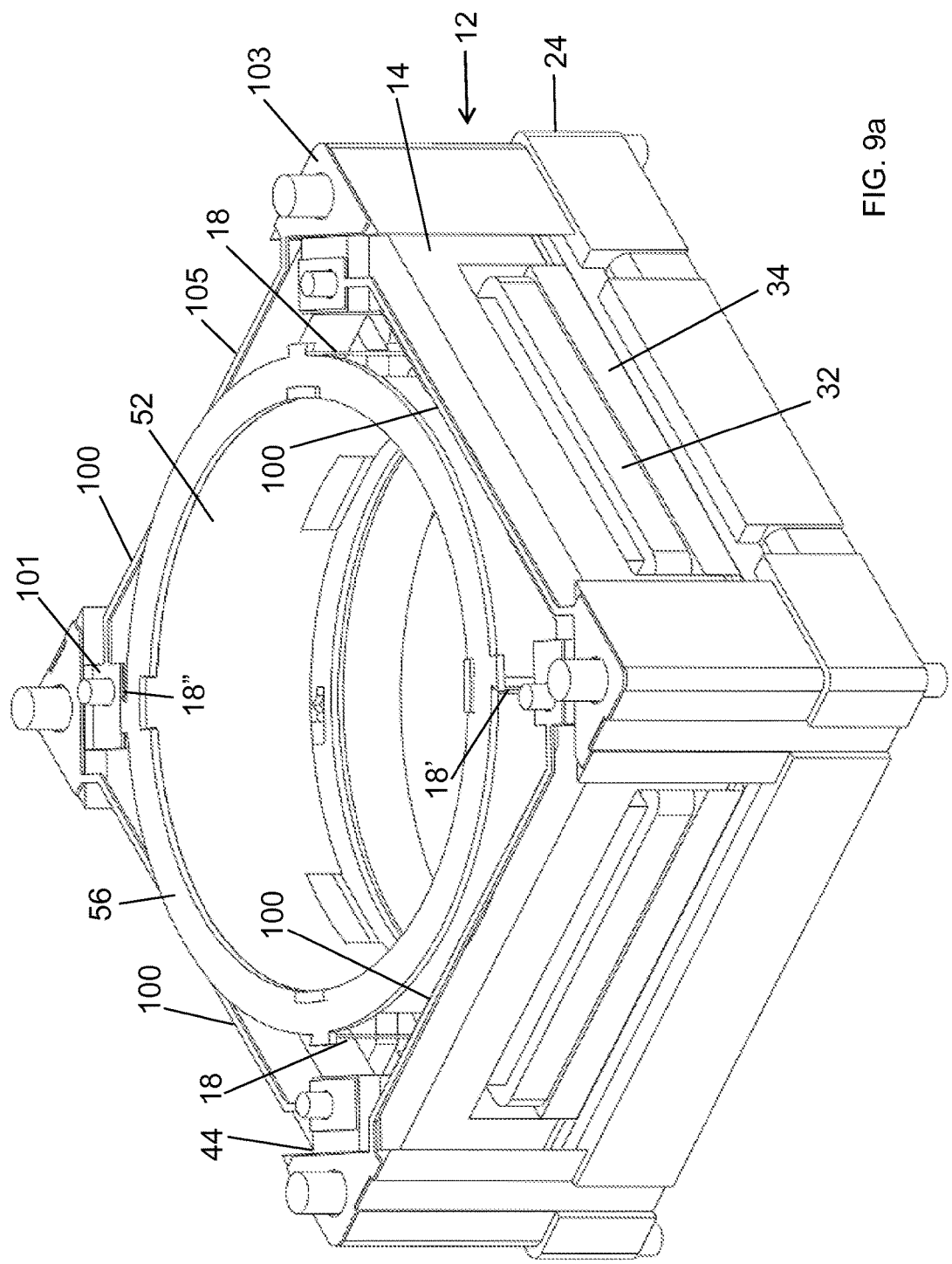
FIG. 9a is a perspective view of a miniature lens driving apparatus according to another embodiment thereof.
Figure 9D:
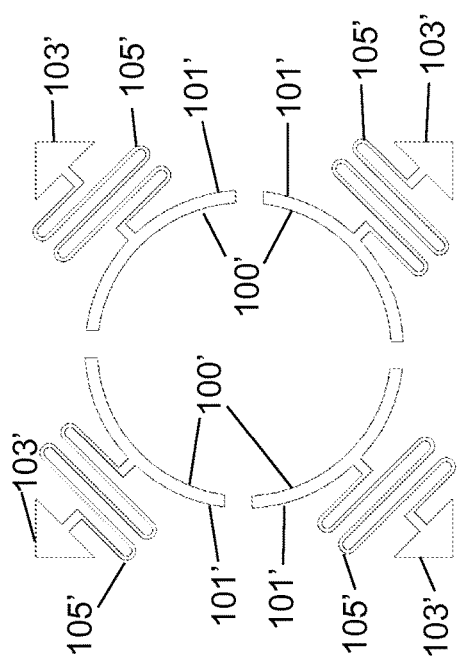
FIGS. 9b-9e show different embodiments of a leaf spring.
Figure 9E:
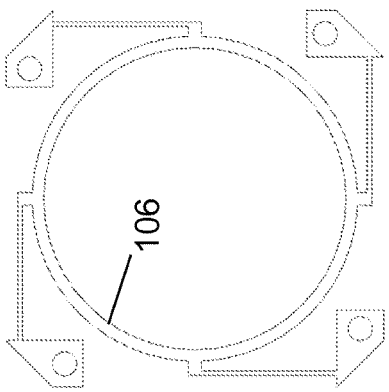
Figure 9C:
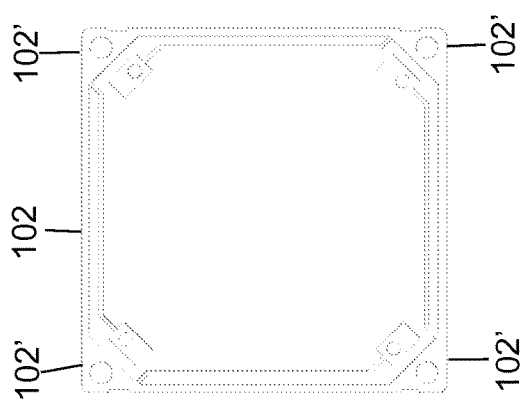
Figure 9B:
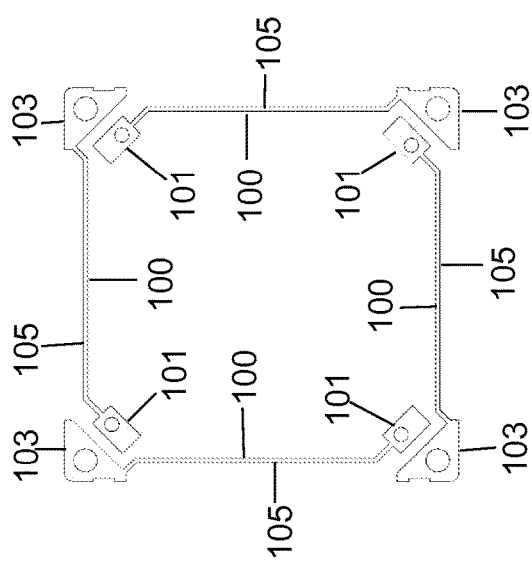

FIGS. 9a-i shows another embodiment of a miniature lens driving apparatus. A plurality of leaf springs 100, 100' may be adopted as shown in FIG. 9a and FIG. 9b. One end 103 of each leaf spring 100 can be firmly attached to the base 24 of the AF mechanism 12 while another end 101 of each leaf spring 100 can be firmly attached to the AF moving platform 14. All the leaf springs 100 may be substantially lying in a same plane which is substantially perpendicular to the optical axis. All leaf springs 100 can be divided into three zones: moving end 101, fixed end 103, and spring arm 105. The moving end 101 can be attached to the lens holder 52 while the fixed end 103 can be attached to the base 24. The spring arm 105 is the portion where the leaf spring 100, 100' deforms to generate elastic force. FIG. 9c shows another embodiment of the leaf spring 102. The fixed ends 102' of the spring are all connected into one piece as shown in the drawing (FIG. 9c). Therefore, a plurality of leaf springs becomes a single leaf spring.

Figure 9I:
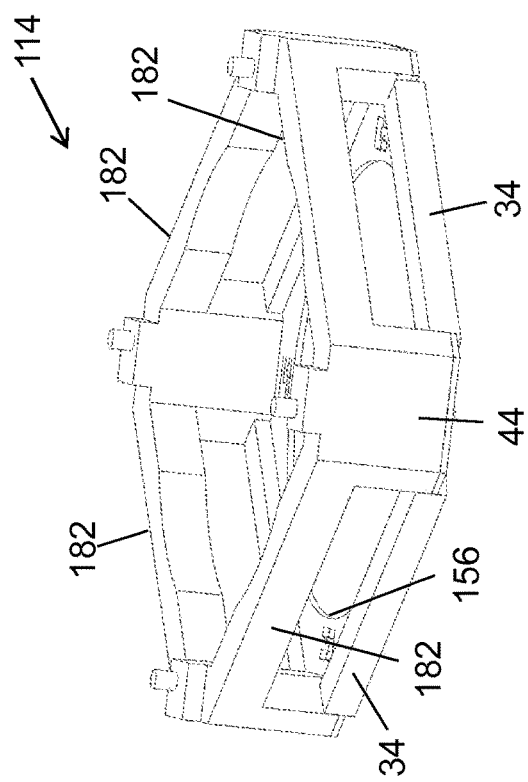
FIG. 9i is a perspective view of the AF moving platform shown in FIG. 9f.
Figure 9H:
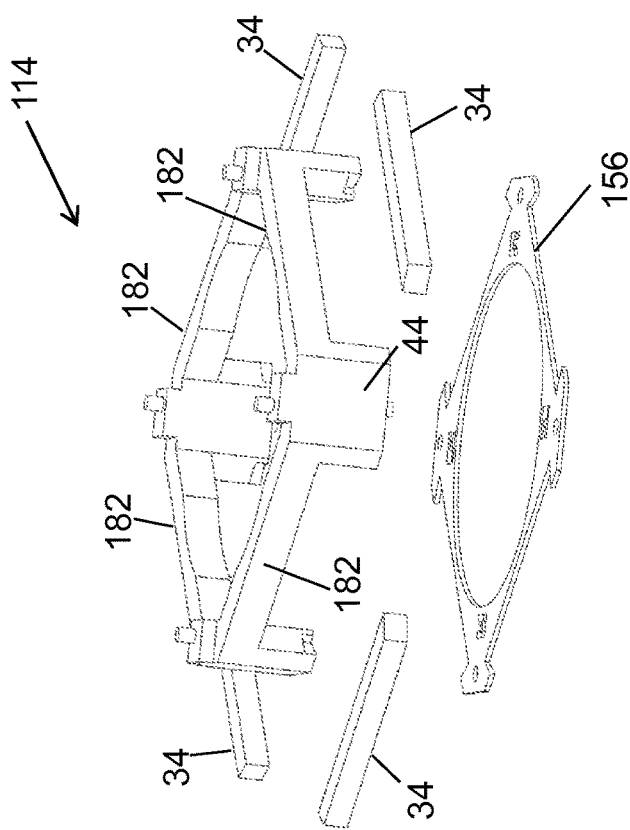
FIG. 9h is an exploded view of an AF moving platform according to another embodiment thereof.

FIGS. 9d and 9e show other embodiments of the leaf spring 100', 106. The moving end 101' can be attached to the lens holder 52 while the fixed end 103' can be attached to the base 24. The spring arm 105' is the portion where the leaf spring 100, 100' deforms to generate elastic force. Various patterns of leaf spring can be adopted. Besides leaf spring, many other types of spring can also be adopted for the same function. Such spring could be but not limited to helix spring, elastic film, etc. FIGS. 9f and 9g are enlarged views of the wires 18' and 18" shown in FIG. 9a respectively. FIGS. 9h and 9i disclose another embodiment of an AF moving platform 114, which may have a wire coupling member 156 mounted at the lower end of the moving platform 114. At least a wire will be connecting the lens holder or upper wire coupling member to AF moving platform via the lower wire coupling member. Moreover, the stiffening member 82 may be integrated into the AF moving platform 114 to form an integrated stiffener 182.

While the miniature lens driving apparatus has been shown and described with particular references to a number of preferred embodiments thereof, it should be noted that various other changes or modifications may be made without departing from the scope of the appended claims.

What is claimed is:

1. A miniature lens driving apparatus comprising:
   (a) a plurality of wires;
   (b) an optical image stabilizing (OIS) mechanism having a lens holder, at least one magnet, and a plurality of coils; wherein the said plurality of coils of the OIS mechanism operatively associates with the said at least one magnet of the OIS mechanism to move the said lens holder of the OIS mechanism along a direction substantially perpendicular to an optical axis; and
   (c) autofocus (AF) mechanism having an AF moving platform movable along the optical axis, at least one coil, and at least one magnet; wherein the said at least one coil of the AF mechanism operatively associates with the said at least one magnet of the AF mechanism to move the said AF moving platform along the optical axis;
   (d) wherein one ends of the plurality of wires are directly connected to the said lens holder of the OIS mechanism while another ends of the plurality of wires are directly connected to the AF moving platform of the AF mechanism.

2. The lens driving apparatus as claimed in claim 1, wherein said AF mechanism further comprises:
   (a) at least one guiding mechanism;
   (b) wherein the said guiding mechanism includes a stationary guide member and a slidable guide member; and
   (c) wherein the stationary guide member is firmly mounted on a base while the slidable guide member is firmly mounted on the AF moving platform.

3. The lens driving apparatus as claimed in claim 2, wherein the said guiding mechanism is selected from the group consisting of guiding shafts, V-shape grooves, dovetail-shaped grooves, C-shaped grooves, guiding planes, guiding holes and guiding rings.

4. The lens driving apparatus as claimed in claim 2, further comprising a stiffening member connected to the slidable guide member.

5. The lens driving apparatus as claimed in claim 4, wherein a viscous liquid is provided in a gap between the stiffening member and the lens holder, and/or a gap between the lens holder and the moving platform.

6. The lens driving apparatus as claimed in claim 5, wherein opposing surfaces of the stiffening member and the lens holder, and/or opposing surfaces of the lens holder and the moving platform are formed with a plurality of pits for receiving therein the viscous liquid.

7. The lens driving apparatus as claimed in claim 1, wherein the OIS mechanism further comprises a wire coupling member attached to the lens holder, and wherein one end of each wire is coupled to the wire coupling member.

8. The lens driving apparatus as claimed in claim 7, wherein the wire coupling member is in the form of a printed circuit board with conductive traces and bonding pads provided thereon.

9. The lens driving apparatus as claimed in claim 7, wherein the wire coupling member is made of plastics, polymers, metal, ceramic, or a composite material made of plastic, polymers, metal, or ceramic.

10. The lens driving apparatus as claimed in claim 7, wherein the wire coupling member is integrated into the lens holder.

11. The lens driving apparatus as claimed in claim 1, wherein the AF moving platform further comprises a wire coupling member, and wherein one end of each wire is coupled to the wire coupling member.

12. The lens driving apparatus as claimed in claim 11, wherein the wire coupling member is in the form of a printed circuit board with conductive traces and bonding pads provided thereon.

13. The lens driving apparatus as claimed in claim 1, wherein the plurality of wires is selected from the group consisting of metal wire, enamel metal wire, metal-clad metal wire, metal-clad plastic wire and combinations thereof.

14. The lens driving apparatus as claimed in claim 1, wherein the plurality of wires comprises materials selected from the group consisting of conductive materials, non-conductive materials, polymeric materials, plastics, rubbers and organic fibers.

15. The lens driving apparatus as claimed in claim 1, wherein the said AF mechanism further comprises a printed circuit board or flexible printed circuit board to provide electric connection.

16. The lens driving apparatus as claimed in claim 1, wherein the AF mechanism and/or the OIS mechanism further comprises at least one Hall sensor or position encoder to sense position of a lens.

17. The lens driving apparatus as claimed in claim 1, wherein the AF mechanism comprises at least one spring with one end connected to a base of the AF mechanism and the other end connected to the AF moving platform.

18. The lens driving apparatus as claimed in claim 17, wherein the spring is selected from the group consisting of leaf spring, helix spring and elastic film.

19. The lens driving apparatus as claimed in claim 18, further comprising at least one Hall sensor or position encoder to sense position of a lens.

20. An electronic image-capturing device comprising the lens driving apparatus claimed in claim 1.

* * * * *

UNITED STATES PATENT AND TRADEMARK OFFICE
CERTIFICATE OF CORRECTION

PATENT NO. : 9,766,426 B2  
APPLICATION NO. : 14/519123  
DATED : September 19, 2017  
INVENTOR(S) : Sio Kuan Lam Page 1 of 1

It is certified that error appears in the above-identified patent and that said Letters Patent is hereby corrected as shown below:

On the Title Page

Item (73), the correct name of the Assignee should be "Sunming Technologies (HK) Limited".

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*